Feb. 15, 1955
L. E. DOWD
2,702,254
METHOD OF SOLVENT TREATING A COATED
REGENERATED CELLULOSE FILM
Filed March 25, 1952
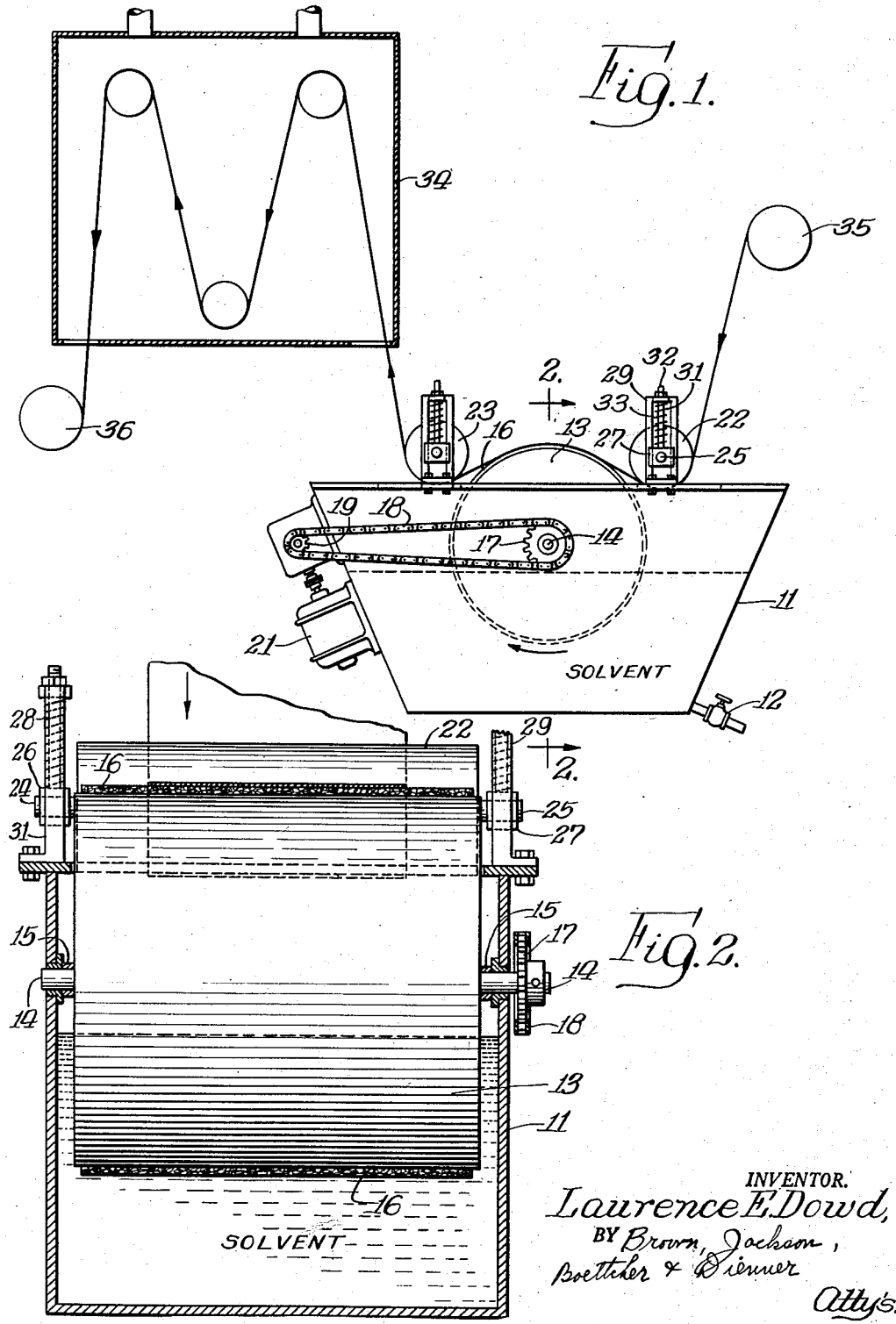
INVENTOR.
Laurence E. Dowd,
BY Brown, Jackson,
Boettcher & Dienner
Attys.

United States Patent Office 2,702,254
Patented Feb. 15, 1955

2,702,254

METHOD OF SOLVENT TREATING A COATED REGENERATED CELLULOSE FILM

Laurence E. Dowd, Chicago, Ill., assignor to Transparent Package Company, Chicago, Ill., a corporation of Illinois Application March 25, 1952, Serial No. 278,435

5 Claims. (Cl. 117—63)

This invention relates to packaging material and particularly to a method for producing novel printed moisture vaporproof coated regenerated cellulose film.

The present application is a continuation in part of my copending application, Serial No. 208,672 filed January 30, 1951, now Patent No. 2,627,483, issued February 3, 1953.

In the aforesaid application there is described a coated regenerated cellulose film which has unique and valuable attributes in that it is substantially moistureproof, may be subjected to distortion, stretching and the like without losing its moistureproof nature, which is stable in contact with wet materials, and which does not lose either its composite character or its moistureproofness, even under such harsh treatment as extended contact with hot water. The said film has a wide range of uses but is particularly useful as a packaging material for encasing products such as meats and the like.

As disclosed in the aforesaid copending application, a film with these unique and outstanding properties may be prepared by applying to a regenerated cellulose film a composition comprising a mixture formed by first reacting together bis-phenol and epichlorhydrin, and then further acting the resulting polymeric, polyhydric alcohol with a drying oil, and a wax together with such optional materials as dryers, solvents, accelerators and the like. The above mixture is applied to the surface of the regenerated cellulose film to be treated, by dipping, spraying or other well known means, followed by curing. More specifically, in preparing a composite regenerated cellulose film in accordance with the procedure described in the aforesaid copending application, a mixture composed of the product formed by reacting bis-phenol and epichlorhydrin as set forth in U. S. Patent No. 2,456,408, a drying oil or mixture thereof, such as linseed, soya, and the like, a metallic dryer, and a solvent such as mineral spirits, is heated to about 60 to 90° C. with stirring. To this is added up to about 10%, based on the solids content of the aforesaid mixture, of a waxy material, such as paraffin wax preferably having a melting point of between about 125 to 160° F. There may be concurrently added an accelerator such as mono or ditertiary butyl hydroperoxide. The above mixture is maintained at about 60 to 90° C., with stirring for about 10 to 60 minutes and is then applied to the surface of the regenerated cellulose film, while still hot. The thickness of coating may of course be varied over a wide range, a convenient thickness being from for example 0.1 to about 0.4 mils. After the coating has been applied the film is heated to about 80 to 120° C. until the coating is dried to a tack-free condition.

The ester product which is one of the essential ingredients used in preparing my novel composite regenerated cellulose film, while conveniently prepared by reacting drying oils with polyhydric alcohols of bis-phenol and epichlorhydrin, may consist more generally of any higher fatty acid esters of polymeric polyhydric alcohols which, alcohols may be prepared in a manner known to the art from the polyhydric phenols with polyhalo alcohols, epihalohydrins or polyepoxy compounds. The preferred polyhydric alcohol which I have used with great success is a commercially available epichlorhydrin-bis-phenol resin having a melting point of about 95 to 105° C. and equivalent weight of 174. The higher fatty acid containing components of my composition are preferably processed linseed oil fatty acids or processed soya oil fatty acids, and may contain varying amounts of free and combined higher fatty acids in the form of glycerides.

While such a coated film has been outstandingly successful as a packaging medium, particularly in the form of a seamless tubular casing for hams and the like, a serious drawback has been the fact that it has been heretofore impossible to produce a successful commercially acceptable printed film of this type. Either inks did not adhere to the coated surface of the film at all, or else the ink images were so spotted, imperfect and generally of such poor quality that the printed film failed to meet the high standards required by the trade.

In accordance with the present invention I have discovered that the hereinbefore described, coated, moisture vapor proof regenerated cellulose film can be processed so as to practically eliminate the difficulties inherent in printing this film. In general the procedure of the present invention comprises contacting the coated film with a solvent such as xylol, nitro benzene, ketones such as methyl ethyl ketone and the like, under carefully controlled conditions, followed by removal of residual solvent and printing on the resulting film surfaces.

My invention will be clearly understood from the following detailed description in conjunction with the drawings wherein:

Figure 1 is a side view of one embodiment of apparatus, for treating coated casing in accordance with my invention; and Figure 2 is a view of the apparatus of Figure 1 taken on the line 2—2 looking in the direction of the arrows as shown.

As shown in the drawings, the apparatus comprises a container or tank 11 made of sheet metal or the like, equipped with a drain valve 12. The tank 11 may be equipped with heating means (not shown) such as a hot plate, coils and the like in order to maintain the tank contents at a predetermined temperature. A wiping wheel 13 is positioned within the tank as shown, with the shaft or axle 14 thereof supported near the ends by bearings 15 secured to opposite sides of the tank 11 as shown. The wiping wheel 13 is in the form of a cylinder, conveniently of metal, having its cylindrical surface covered with a porous sheet material 16 such as felt, fabric or the like.

Secured to one end of the shaft 14 is a sprocket wheel 17 in engaging relation with a sprocket chain 18, the said chain being also in engagement with a driving sprocket 19. An electric motor 21 equipped with conventional speed reducing means furnishes the power for effecting rotation of the wiping wheel 13 as shown.

Positioned on top of the tank 11 are idler rolls 22 and 23 with their axes parallel to that of the wiping wheel 13. Idler roll 22 has its shaft ends 24 and 25 supported by bearing blocks 26 and 27, each block being in vertically moveable engaging relation with its standard 28 and 29. Block 26 has fixed to it a member 31 which is threaded and whose end passes through an aperture in the top of the standard 28. Vertical adjustments are made by tightening or loosening the nut 32 against the pressure of the spring 33. Each of the support structures or idler rolls 23 and 24 are similarly constructed.

Indicated by numeral 34 is a drying chamber or tower of conventional design and construction adapted to remove residual solvent from the film after its solvent treatment.

Referring to Figure 1, coated film produced as described in my aforesaid pending application, is unwound from roll 35, passes under idler roll 22, over wiping wheel 13 where it contacts the solvent bearing felt 16 as shown, under idler roll 23, and into tower 34 where the solvent-wetted film is dried, and is wound on a power driven roll 36.

Tank 11 contains xylol at a temperature of 60° C. although this may vary from about 55° C. to 80° C. The temperature of the solvent should be above the melting point of the wax component of the film coating. With a coated film having a coating thickness of say 0.2 mil, using as the solvent, xylol at a temperature of 60° C., and operating at a line speed of 13' per minute the resulting film after removal of residual solvent not only receives printing satisfactorily but maintains its moisture vapor resistance substantially unimpaired. The tangential speed of the wiping roll 13 in a direction opposite to that of the film is preferable from .9/1 to 1.1/1 with respect to the speed of the film; the speed of the roll 13 should be sufficient so as to provide fresh solvent as needed at the contact area.

While there is some slight increase in permeability of film thus treated, such slight increase is generally considered desirable when the film is to be used as a meat package since it permits "breathing" and results in the best balance between weight retention, flavor, and appearance of the packaged meat item.

The table below shows the percent moisture loss of various meat items, under identical conditions, packaged in untreated film (uncoated regenerated cellulose), coated film produced as described in my co-pending application Serial No. 208,672 filed January 30, 1951 now U. S. Patent No. 2,627,483, and the aforesaid coated film which has been conditioned in accordance with the process of the present invention.

| Packaging Material | Regenerated Cellulose Film | Coated Regenerated Cellulose Film | Coated and Conditioned Regenerated Cellulose Film | Storage Time, Days |
|---|---|---|---|---|
| Cooked Ham | 4.33 | 0.58 | 1.26 | 7 |
| Smoked Half Ham | 4.68 | 1.01 | 1.47 | 10 |
| Boneless Skinned Smoked Ham | 4.23 | 1.44 | 1.54 | 10 |

It will be seen from the above figures that while the uncoated film containing the meat items described showed a shrinkage of over 4%, the moisture loss in the case of meat items packaged in the film conditioned as per the present process was only about one-third as great. While the coated film exhibited somewhat greater moisture retention, over the same film "conditioned" as in the present process, the coated film (unconditioned) could not be printed successfully in contrast to the conditioned film which showed superior ink reception.

When the treated surface of film processed in accordance with my invention is printed, for example on a multigraph press using oil-base inks, the resulting printed image, after drying, is not only of excellent quality, but has unusually high resistance to rubbing and scratching both on dry as well as rewet film.

When the film used in the practice of the present invention is in the form of a seamless flattened tube of regenerated cellulose which has been coated with the coating material described in my co-pending application Serial No. 208,672 filed January 30, 1951, the resulting printed tubing is eminently suitable as a packaging material for such meat products as hams and the like which require that the tube be wetted and stretched over the meat.

I have chosen the particular embodiments described above as illustrative of my invention and it will be apparent that various modifications may be made without departing from the spirit and scope of my invention which modifications are aimed to cover by the appended claims. Thus while I have shown in my illustrative embodiment the processing of one side of the treated film it will be apparent that both sides may be treated either simultaneously or in sequence whereby to result in a film which may be printed on both sides.

I claim:

1. A method of conditioning regenerated cellulose film having a waxy, waterproof and ink-repellent surface, to impart ink receptiveness and ink adhesion thereto, said film being coated with a polymerized mixture comprising drying oil fatty acid esters of the reaction product of epichlorhydrin and bis-phenol and up to about 10 percent by weight based on said polymerized mixture of a waxy material, comprising contacting the said coated film with a volatile solvent for the waxy material at a temperature above the melting point of said waxy material, for a time sufficient to remove substantially only the surface exposed wax, and then removing the solvent.

2. A method of conditioning regenerated cellulose film having a waxy, waterproof and ink-repellent surface to impart improved ink receptiveness and ink adhesion thereto, said cellulose film having bonded to the surfaces thereof a thin resinous coating comprising a polymerized mixture of drying oil fatty acid esters of the reaction product of a polyhydric phenol and a member of the group consisting of polyhalo alcohols, epihalohydrins and polyepoxy compounds, and up to about 10 percent by weight of a waxy material based on the polymerized mixture, which comprises, prior to printing, contacting the said coated film with a volatile solvent for the wax at a temperature above the melting point of said wax, for a time sufficient to remove substantially only the surface exposed wax, and then removing the solvent.

3. A method of conditioning regenerated cellulose film having a waxy, waterproof and ink-repellent surface to impart ink receptiveness thereto, said film having bonded to the surfaces thereof a thin resinous coating comprising a polymerized mixture of drying oil fatty acid esters of the reaction product of epichlorhydrin and bis-phenol and up to about 10 percent by weight based on said polymerized mixture of a waxy material, which comprises contacting the said coated film with a volatile solvent for the waxy material at a temperature above the melting point of the said waxy material for a time sufficient to remove a small percentage of the waxy material from the said coating and then drying the thus treated film.

4. The method of claim 3 where the solvent is xylol.

5. A method of conditioning a transparent moisture-proof film having a waxy and ink-repellent surface to impart ink receptiveness thereto, said film comprising a regenerated cellulose base coated with a continuous thin resinous film formed by applying to the surface of said film a liquid mixture comprising drying oil fatty acid esters of a polymeric polyhydric alcohol, selected from the group consisting of the reacton product of epichlorhydrin and bis-phenol and the reaction product of a polyhydric phenol and a member of the group consisting of polyhalo alcohols, epihalohydrins and polyepoxy compounds, and up to about 10% by weight based on said esters of a paraffin wax, and then polymerizing said mixture in situ by heating same, which comprises contacting the thus treated film with a volatile solvent for the paraffin wax at a temperature above the melting point of said wax, for a time sufficient to remove substantially only the surface exposed wax and heating the thus treated material sufficiently to remove residual solvent.

References Cited in the file of this patent

UNITED STATES PATENTS

| | | |
|---|---|---|
| 2,022,490 | Charch | Nov. 26, 1935 |
| 2,386,626 | Nadeau | Oct. 9, 1945 |
| 2,456,408 | Greenlee | Dec. 14, 1948 |
| 2,573,957 | Daniel | Nov. 6, 1951 |